June 5, 1962 W. J. COYLE 3,037,734
SHOCK MOUNT
Filed Nov. 16, 1960
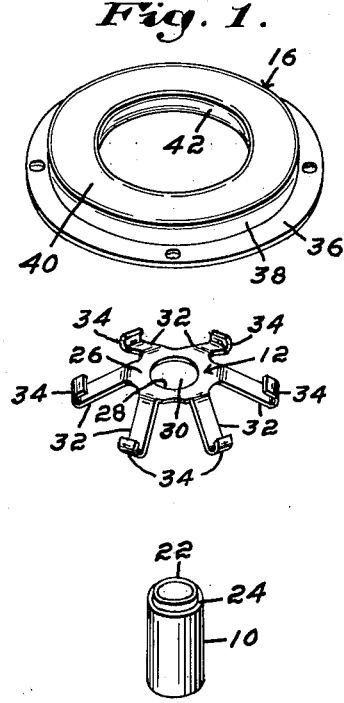
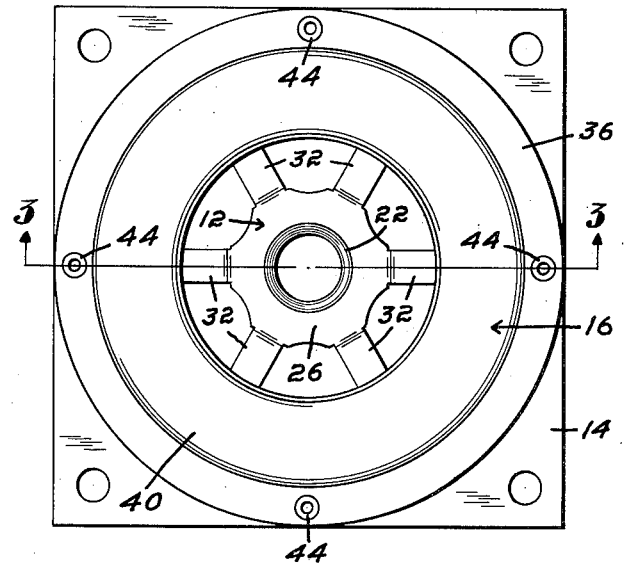
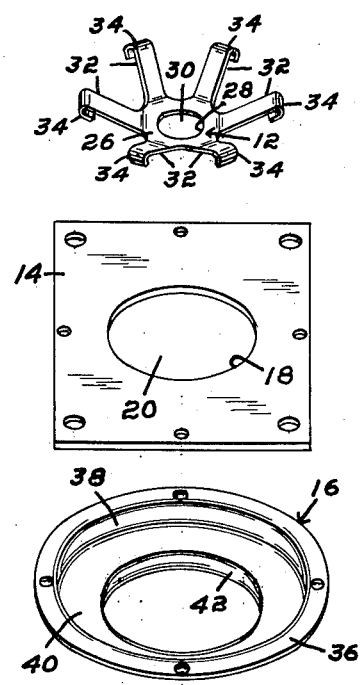
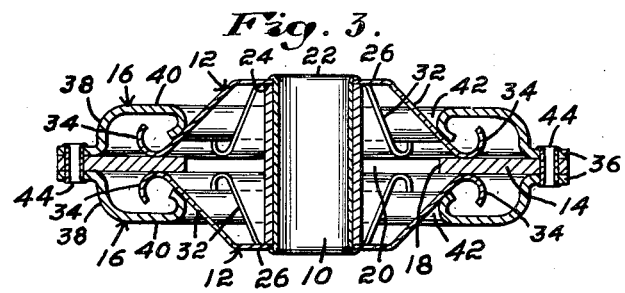
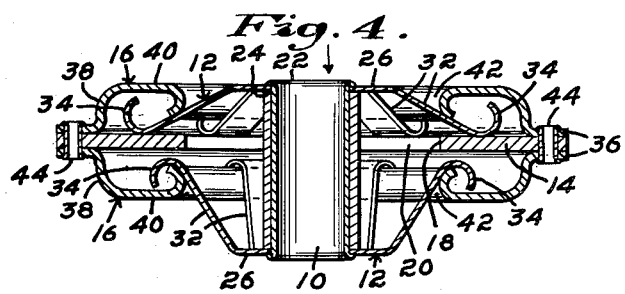
Inventor:
William J. Coyle,
by Walter S. Jones
Atty.

United States Patent Office 3,037,734
Patented June 5, 1962

3,037,734
SHOCK MOUNT
William J. Coyle, Waltham, Mass., assignor to United-Carr Fastener Corporation, Cambridge, Mass., a corporation of Delaware
Filed Nov. 16, 1960, Ser. No. 69,674
1 Claim. (Cl. 248—358)

This invention relates generally to shock mounts, or as they are sometimes called, vibration isolators, and more specifically a shock mount using opposed one piece spring elements to act as damping means.

Most of the shock mounts presently manufactured are made up of a number of elements which act as damping means or as snubbing means in conjunction with a damping means. The elements themselves are often expensive to manufacture and the assembly of the shock mount is expensive because it is, for the most part, accomplished by hand.

Applicant's device preferably employs a pair of one piece spring damping elements which operate in cooperating with a mounting member and supporting members. This type of construction allows the production of an inexpensive, easily assembled mount.

An object of the invention is to provide a shock mount having opposed springs frictionally assembled to a mounting plate.

A further object of the invention is to provide a shock mount using a spring formed from a single piece of resilient material and having resilient arms supported on a supporting member.

Other objects of the invention will, in part, be obvious, and will, in part, appear hereinafter.

In the drawings:

FIG. 1 is an exploded isometric view of the pieces of the shock mount;

FIG. 2 is a top plan view of a shock mount assembly;

FIG. 3 is a section taken on line 3—3 of FIG. 2; and

FIG. 4 is a section showing the relation of the parts when the centre post is under pressure.

Referring to the drawing, particularly FIGS. 1 through 4, there is illustrated a preferred form of shock mount comprising a supporting member 10, a pair of damping springs 12, a mounting plate 14 and a pair of retainer plates 16. The mounting plate 14 is a flat piece of substantially rectangular metal or other solid material, as for example, plastic or metal having an inner wall 18 defining a circular mounting aperture 20. Numerous small apertures are formed adjacent the marginal edge of said mounting plate 14 for a purpose to be described hereinafter.

The supporting member 10 is tubular in form, open at both its terminal ends 22. A shoulder 24 is formed in close proximity to each of said terminal ends 22.

The damping springs 12 are formed from a flat piece of resilient metal or from metal which is, after forming, heat treated to impart resiliency, said springs 12 comprise a central element 26 of circular configuration, although numerous other geometric configurations would function satisfactorily, having an engaging edge 28 defining a central aperture 30 as shown in FIG. 1. Radiating from the edge of said central element 26 opposite to said engaging edge 28, much as the spokes of a wheel, in a direction away from the axis of the central element 26, are a series of arms 32. The free ends of said arms 32 are bent back to form U-shaped loop portions 34. One of the important features in this particular embodiment of the invention is the comparatively flat aspect of said arms 32.

The retainer plates 16 each comprises a circular flange portion 36, a connector portion 38 in integral angular relationship with the inner circumference of said flange portion 36 and a holding portion 40 in integral angular relationship with said connector portion 38 and is spaced in substantially parallel relationship with the plane of said flange portion 36, as shown in FIG. 1.

To engage the different members of the mount, the supporting member 10 is passed between the inner wall 18 of the mounting plate 14 until said inner wall 18 lies on the same line as the midline of the length of said supporting member 10. A damping spring 12 is then placed in superimposed abutting relationship with a portion of the shoulder 24 of said supporting member 10 with the arms 32 of said damping spring 12 pointing in the general direction of said mounting plate 14 and the free ends of the loop portions 34 of said arms 32 pointed in a direction away from said mounting plate 14. The terminal end 22 of said supporting member 10 having been passed between the engaging edge 28 of said central element 26 is bent back over and against a portion of said central element 26 adjacent the engaging edge 28 rigidly holding said damping spring 12 to said supporting member 10. The same operation is performed with the remaining damping spring 12 at the opposite terminal end 22 of said supporting member 10 and when completed said mounting plate 14 is held between the opposed loop portions 34 of said arms 32 as best shown in FIG. 3. A retainer plate 16 is then placed on the mounting plate 14 with the flange portion 36 of said retainer plate 16 resting in abutting relationship on said mounting plate 14 and the holding portion 40 of said retainer plate 16 resting on a portion of said arms 32 of said damping spring 12 approximately between said central element 26 and said loop portion 34. It is sometimes desirable to have a skirt portion 42 formed in integral angular relationship with said holding portion 40 and in spaced relation with said connector portion 38. In this case, the edge of the skirt portion 42 will rest on the arms 32, as described for the holding portion 40. The said skirt portion 42 will prevent the arms 32 from slipping between the holding portion 40 when the mount is under axial stress. The remaining retainer plate 16 is mounted in the same manner in opposed relationship with its counterpart and the retainer plates 16 are engaged to the mounting plate 14 by passing grommets 44 between the edges of the marginal apertures formed in said retainer plates 16 and the mounting plate 14 then clinching the grommets as best shown in FIG. 3.

The assembled shock mount is capable of absorbing damaging vibrations, especially those transmitted along lines parallel to the axis of said supporting member 10, through the flexing of the damping springs 12 and the snubbing action of the loop portions 34 of the arms 32 sliding over the mounting plate 14. For example, if a force were applied to the shock mount in the direction of the arrow shown in FIG. 4, and mounting plate 14 were held stationary on a support, the uppermost damping spring 12 would move toward the mounting plate 14 while the arms 32 of said damping spring 12 moved away from the axis of said supporting member 10. This latter movement causes the loop portions 34 of said arms 32 to slide over the mounting plate 14 creating a frictional snubbing action. At the same time the other damper spring 12 is forced away from the mounting plate 14 until the arcuate part of the loop portion 34 hooks the skirt portion 42 of the retainer plate 16 stopping the movement. During this period, the supporting member 10 has moved a certain distance between the inner wall 18 of said mounting plate 14. Of course, the hooking action will not take place unless the force is sufficient to cause considerable flexing of the arms 32 of the, in this case, upper damper spring 12. Further-more, the size and material of the damper springs 12 will determine how easily their arms 32 can be flexed.

The applicant's shock mount is particularly adapted for use in high heat applications since the damping springs 12 may be formed of materials which are capable of resisting high temperatures without serious loss of resiliency.

Since certain other obvious modifications may be made in this device without departing from the scope of the invention, it is intended that all matter contained herein be interpreted in an illustrative and not in a limiting sense.

I claim:

A shock mount comprising a tubular columnar member having terminal ends, at least one pair of retainer plates, a mounting plate and at least one pair of damping springs, each of said damping springs having a series of resilient arms radially attached to a central element, said central element having an engaging edge defining an aperture, each of said terminal ends of said columnar member attached to one of said central elements, each of said resilient arms having a free end bent back on itself to form a U-shaped loop portion, each of said retainer plates having a flange portion on the outer periphery of said retainer plates and an arced skirt portion on the inner periphery of said retainer plates, said skirt portion movably engaging each of said resilient arms and said arced skirt portion bent in a direction opposite to said U-shaped loop portion of said resilient arms and spaced therefrom, whereby said loop portion may engage said arced skirt portion to cushion extreme axial shocks, said flange portion affixed to said mounting plate, said damping springs and said columnar member mounted in movable relationship to said retainer plates and said mounting plate.

References Cited in the file of this patent

UNITED STATES PATENTS

| | | |
|---|---|---|
| 2,243,660 | Thompson | May 27, 1941 |
| 2,902,273 | Hohenner | Sept. 1, 1959 |
| 2,908,489 | Ludeke | Oct. 13, 1959 |